(12) United States Patent
Terasawa et al.

(10) Patent No.: US 6,418,086 B2
(45) Date of Patent: Jul. 9, 2002

(54) BATTERY LID STRUCTURE FOR A TIMEPIECE CASE AND A TIMEPIECE CASE

(75) Inventors: Dai Terasawa; Takasuke Yokote, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/767,507

(22) Filed: Jan. 23, 2001

(30) Foreign Application Priority Data

Feb. 7, 2000 (JP) .......................................... 2000-28791

(51) Int. Cl.[7] .............................................. G04B 37/00
(52) U.S. Cl. .......................... 368/88; 368/203; 368/204
(58) Field of Search .......................... 368/88, 281, 282, 368/203–205, 309

(56) References Cited

U.S. PATENT DOCUMENTS 4,232,512 A * 11/1980 Yoshikawa et al. ......... 368/276
4,250,573 A *  2/1981 Saito ...................... 340/387.1
4,854,694 A *  8/1989 Hirano et al. ............... 351/224

* cited by examiner

Primary Examiner—Bernard Roskoski
(74) Attorney, Agent, or Firm—Adams & Wilks

(57) ABSTRACT

The problem is to provide a battery lid structure for a timepiece case, which does not require complicate machining, such as for slant surfaces and stoppers, in an inner surface of a back lid or case bottom surface, and can reduce a thickness. The back lid has, at an immediately underneath the battery accommodating hole, a different-shaped battery hole having a pair of larger-diameter arcs and a pair of smaller-diameter arcs in an alternate fashion. A battery lid is fitted in the battery hole in a manner described later. The battery lid has arcuate penthouses provided in plurality corresponding to the larger-diameter arcs on an inner side of the timepiece and having a smaller radius than a radius of the larger-diameter arc to have walls at ends thereof, different-shaped barrels continuing from a timepiece-outer side of the arcuate penthouse and having a radius smaller than the radius of the smaller-diameter arc, straight barrels continuing from a timepiece-outer side of the different-shaped barrel and having a radius greater than the radius of the arcuate penthouse, and a larger-diameter flange continuing from a timepiece-outer side of the straight barrels and having a radius greater than the radius of the larger-diameter arc to provide a rectangular groove in its outer surface. An elastic O-ring for waterproof seal is clamped between a timepiece-interior-side surface of the larger-diameter flange and a timepiece-exterior-side surface of the back lid or case bottom surface. The arcuate penthouse has tapered portions formed at circumferential tips on a wall-opposed side, and the arcuate penthouse has an arcuate protrusion in part of a surface on the timepiece-exterior side.

4 Claims, 7 Drawing Sheets

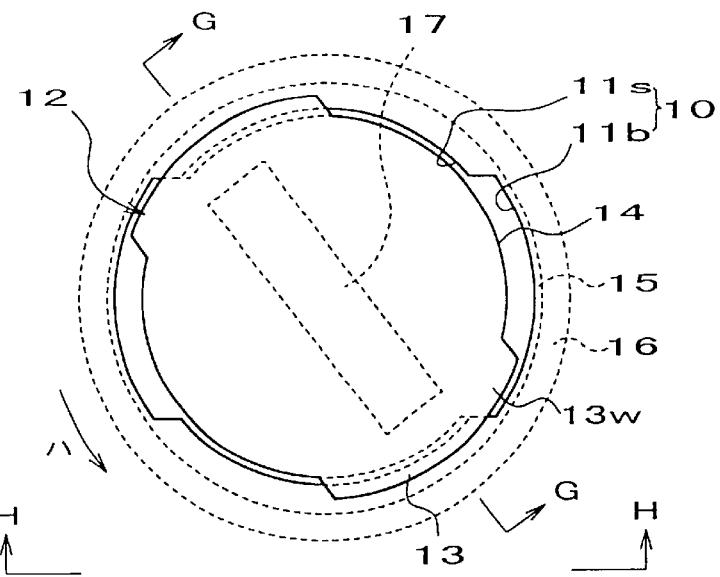
FIG.8A
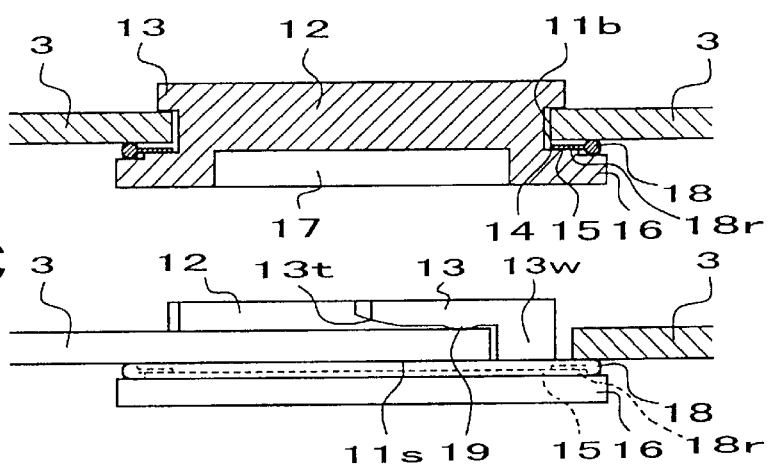
FIG.8B
FIG.8C
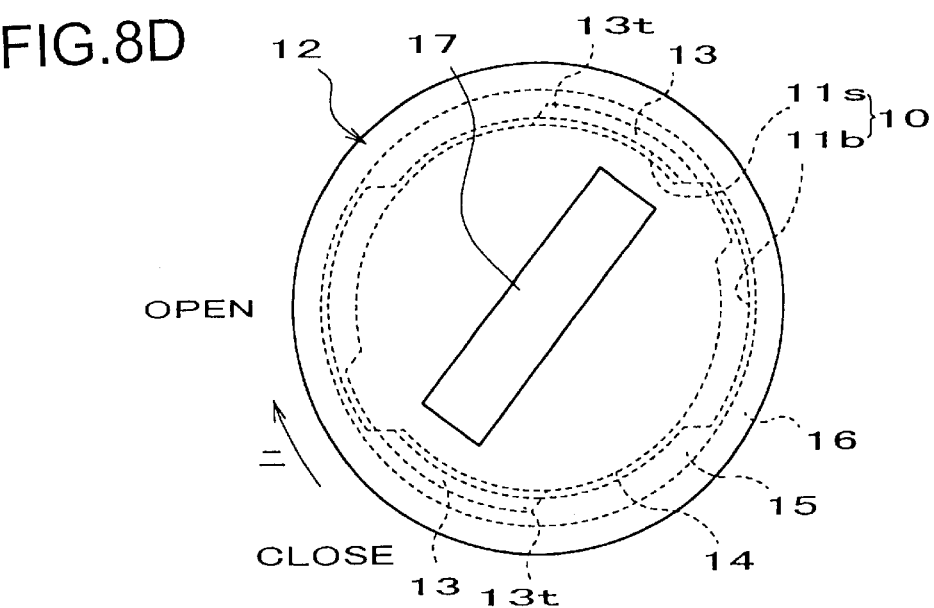
FIG.8D

BATTERY LID STRUCTURE FOR A TIMEPIECE CASE AND A TIMEPIECE CASE

BACKGROUND OF THE INVENTION

1. Field of the Invention

The present invention relates to a timepiece and a battery lid structure for a timepiece case.

2. Related Art

Conventionally, there have been those using bayonet mechanisms as a method for fitting a timepiece-case battery lid to a timepiece-case back lid having a back lid or a bottom-surface battery hole of an integral-type timepiece case.

The forgoing method for fitting a battery lid using a bayonet mechanism involves the following problems.

(1) Manufacture cost is high because of the necessity of complicate machining, such as for slant surfaces or stoppers, on an inner bottom surface of a back lid or case on a side to which the battery lid is to be fitted.

(2) In order to fit with and positively hold a battery lid, the bottom surface of the back lid or case requires a thickness greater than a predetermined thickness resulting in increase of timepiece overall thickness.

It is an object of the present invention to provide a battery lid structure for a timepiece case which solves the problems possessed by the related art and can reduce the thickness of the bottom surface of the back lid or case without the necessity of complicate machining, such as for slant surfaces or stops, in a bottom inner surface of the back lid or case with a result that the timepiece overall can be reduced in thickness.

SUMMARY OF THE INVENTION

A first form of the present invention solved the above problem is a battery lid structure comprising: a case battery hole circumferentially having a plurality of alternate larger-diameter arcs and smaller-diameter arcs in a bottom surface of a back lid of a timepiece case having a back lid or an integral-type timepiece case; arcuate penthouses provided in number corresponding to the large-diameter arcs in the battery lid at a timepiece-interior side and having a radius smaller than a radius of the larger-diameter arcs to have a wall portion at an end thereof; a different-shaped barrel portion continuing from a timepiece-exterior side of the arcuate penthouse and having a radius smaller than a radius of the small-diameter arc; a straight barrel portion continuing from a timepiece-exterior side of the different-shaped barrel portion and having a radius greater than a radius of the arcuate penthouse; a large-diameter flange portion continuing from an timepiece-exterior side of the straight barrel portion and having a radius greater than a radius of the large-diameter arc to provide a rectangular groove in an outer surface thereof; and a sealing elastic O-ring clamped between a surface of the large-diameter flange portion at the timepiece-interior side and a surface of the back lid or the case bottom surface at the timepiece-exterior side; wherein a circumferential tip of the arcuate penthouse at a wall-opposed side is formed as a tapered portion; the arcuate penthouse in part of a surface at the timepiece-exterior side having an arcuate protrusion; and the battery lid being fitted between the surface of the arcuate penthouse of the battery lid at the timepiece-exterior side and the surface of the straight barrel portion at a timepiece-interior side, in a manner clamping the small-diameter arc portion of the battery hole.

A second form of the invention solved the above problem is a battery lid structure for a timepiece case that, in the first form, a rib is provided which horizontally protrudes from an entire periphery of an inner surface of the sealing elastic O-ring.

The structure as in the first form provides the following effect.

That is, the battery lid is assembled matched to the form of the different-shaped battery hole provided in the timepiece-case back lid or case bottom surface, and a coin or the like is inserted in the rectangular groove in the outer surface of the battery lid and the battery lid is rotated. Thereupon, the small-diameter arc portion around the battery hole in the back lid or case bottom surface enters from the tapered portion at the circumferential tip of the arcuate penthouse at a wall-opposed side to between a timepiece-exterior side surface of the arcuate penthouse and the timepiece inner side surface of the straight barrel portion. The abutment of the tip of the smaller-diameter arc portion against an end wall of the smaller-diameter arcuate. penthouse regulates the battery lid from rotating furthermore. Also, the battery lid is prevented from vertically chattering by an elastic force of the O-ring clamped between a timepiece-exterior-side surface of the back lid or case bottom surface and the timepiece-interior-side surface of the larger diameter flange portion of the battery lid. Furthermore, interference occurs between an arcuate protrusion provided in part of the timepiece-exterior-side surface of the arcuate penthouse and the smaller-diameter arcuate portion around the battery hole in the back lid or case bottom surface. Heavy tightening is made upon rotating the battery lid thus preventing against disengagement due to natural reverse rotation.

When removing the battery lid, a coin or the like is inserted in the rectangular groove in the outer surface of the battery lid to rotate the battery lid in a direction reverse to the forgoing case. As a result, the arcuate penthouse of the back lid comes to a position corresponding to the larger-diameter arc portion of the battery hole in the back lid or case bottom surface. The smaller-diameter arc portion is released from clamping by the timepiece-exterior-side surface of the arcuate penthouse of the battery lid and the timepiece-interior-side surface of the straight barrel portion, enabling the battery lid to be removed.

The structure as in the second form provides the following operation, besides the operation of the first embodiment.

That is, the rib protruding horizontally from the entire periphery of the inner surface of the sealing elastic O-ring is clamped between the arcuate penthouse and the straight barrel portion of the battery lid. Accordingly, when the battery lid is removed from the battery hole of the timepiece case, the sealing elastic O-ring will not be disengaged from the battery lid. As a result, there is no possibility that the sealing elastic O-ring be fallen out and lost.

BRIEF DESCRIPTION OF THE DRAWINGS

FIG. 3 show positional relationships between the battery hole and the battery lid in a state the battery lid is ready for removal, wherein

FIG. 4 show positional relationships between the battery hole and the battery lid in a state the battery lid is closed and not to be removed, wherein

FIG. 7 show positional relationships between the battery hole and the battery lid in a state the battery lid is ready for removal, wherein

FIG. 8 show positional relationships between the battery hole and the battery lid in a state the battery lid is closed and not to be removed, wherein FIG. 8A is a plan view as viewed from a timepiece-interior side, FIG. 8B is a sectional view on line G—G in FIG. 8A, FIG. 8C is a sectional view on line H—H in FIG. 8A, and FIG. 8D is a backside view as viewed from a timepiece-exterior side.

DETAILED DESCRIPTION OF THE PREFERRED EMBODIMENTS (First Embodiment)

A first embodiment of the present invention will be explained below with reference to the drawings.

Figure 1:
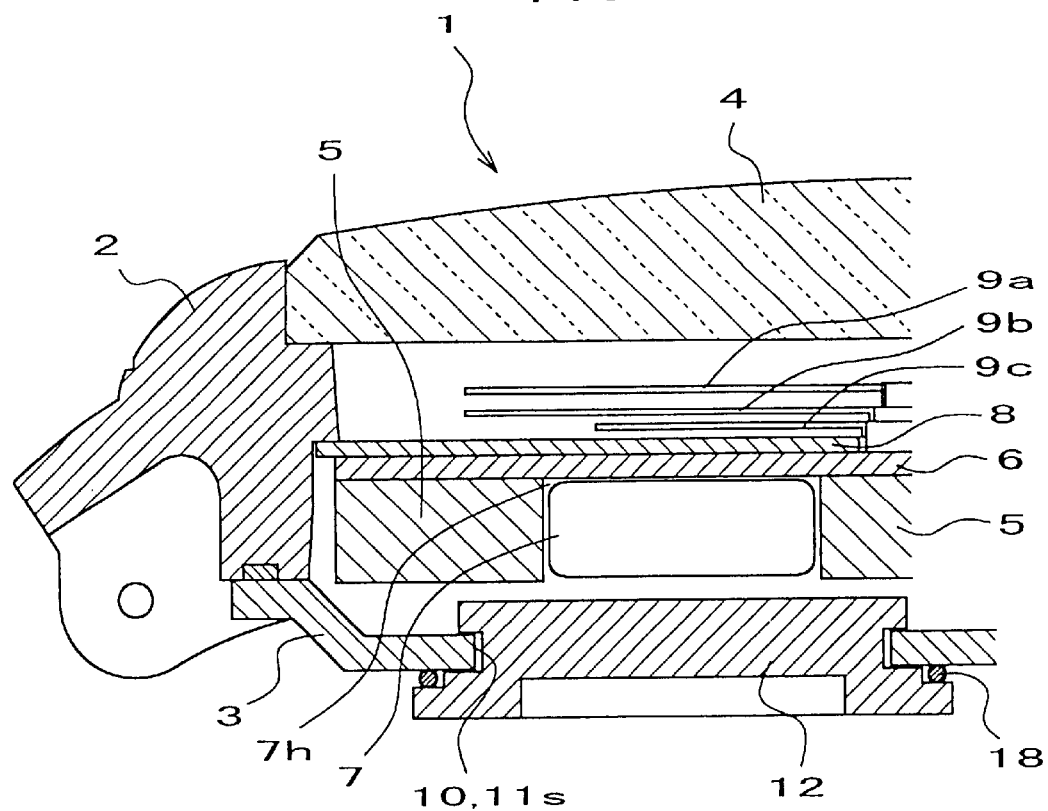
FIG. 1 is a sectional view showing an overall structure that a battery lid structure for a timepiece case of the invention is applied to a timepiece case with a back lid.
Figure 2:
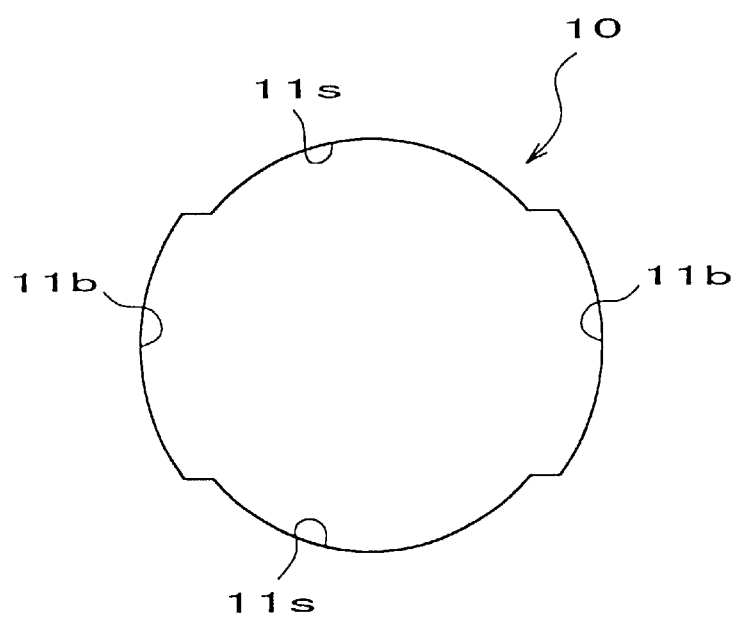
FIG. 2 is a plan view showing a shape of a battery hole of a back lid in one embodiment of the invention.
Figure 3A:
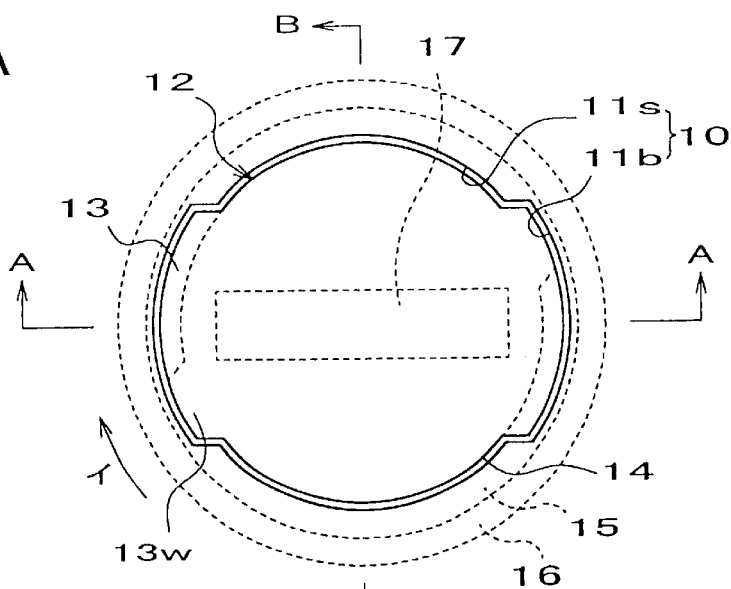
FIG. 3A is a plan view as viewed from a timepiece-interior side.
Figure 3B:
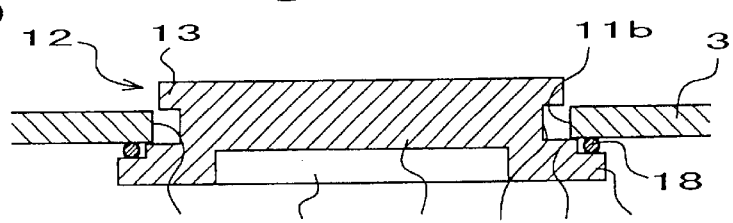
FIG. 3B is a sectional view on line A—A in FIG. 3A.
Figure 3C:
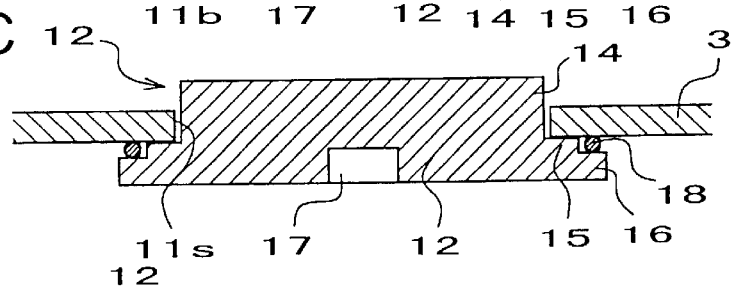
FIG. 3C is a sectional view on line B—B in FIG. 3A.
Figure 3D:
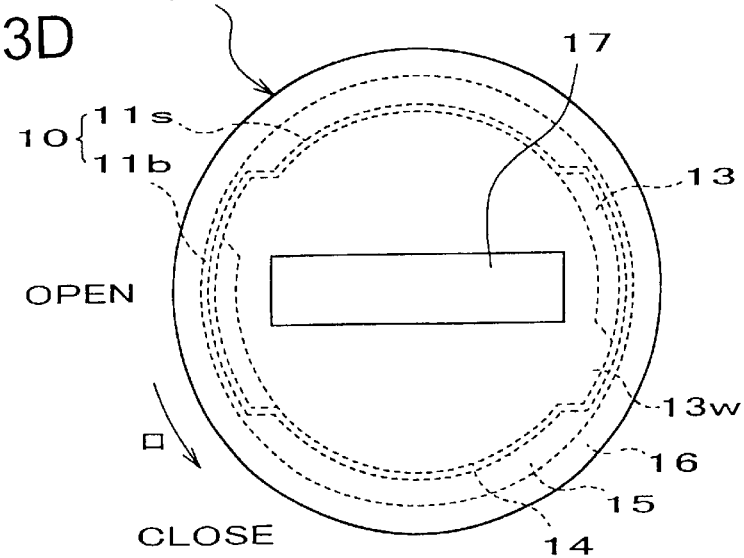
FIG. 3D is a backside view as viewed from a timepiece-exterior side.
Figure 4A:
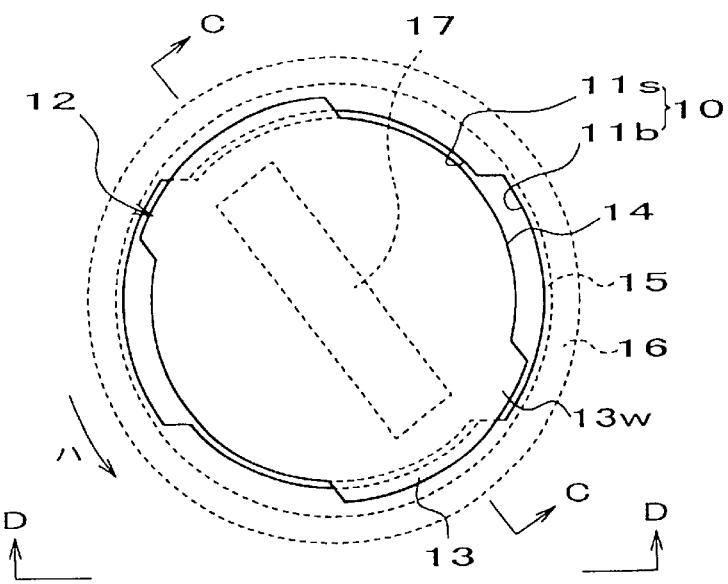
FIG. 4A is a plan view as viewed from a timepiece-interior side.
Figure 4B:
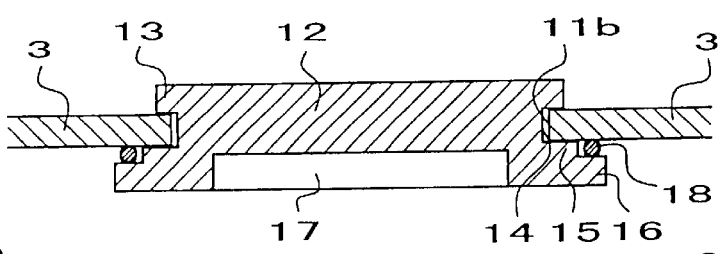
FIG. 4B is a sectional view on line C—C in FIG. 4A.
Figure 4C:
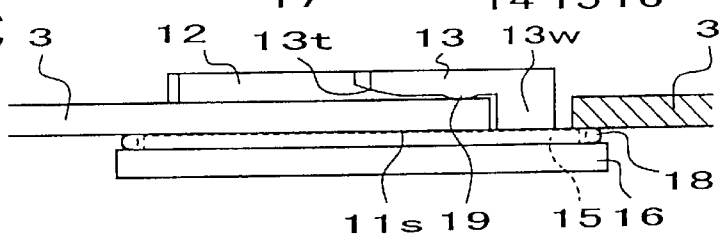
FIG. 4C is a sectional view on line D—D in FIG. 4A.
Figure 4D:
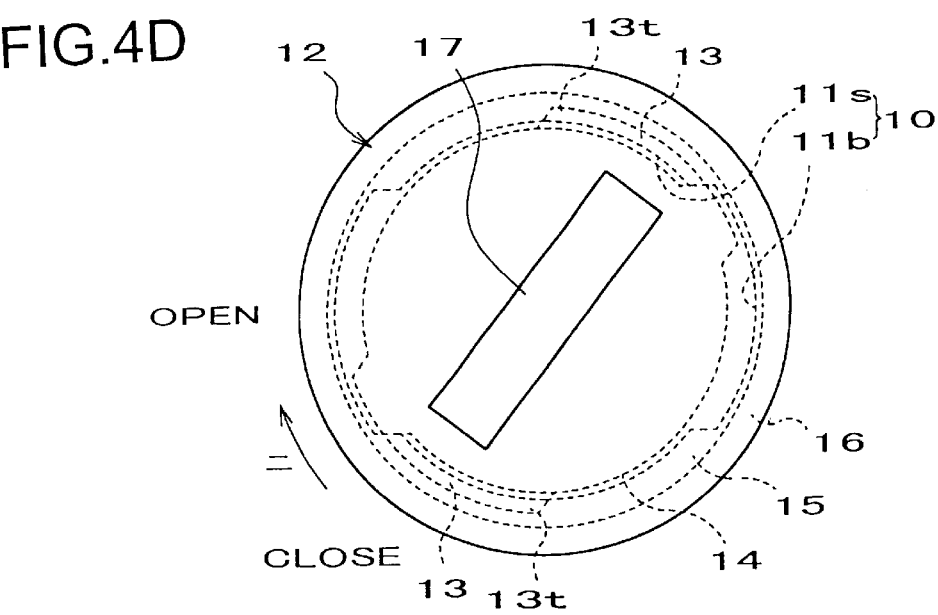
FIG. 4D is a backside view as viewed from a timepiece-exterior side.
Figure 5:
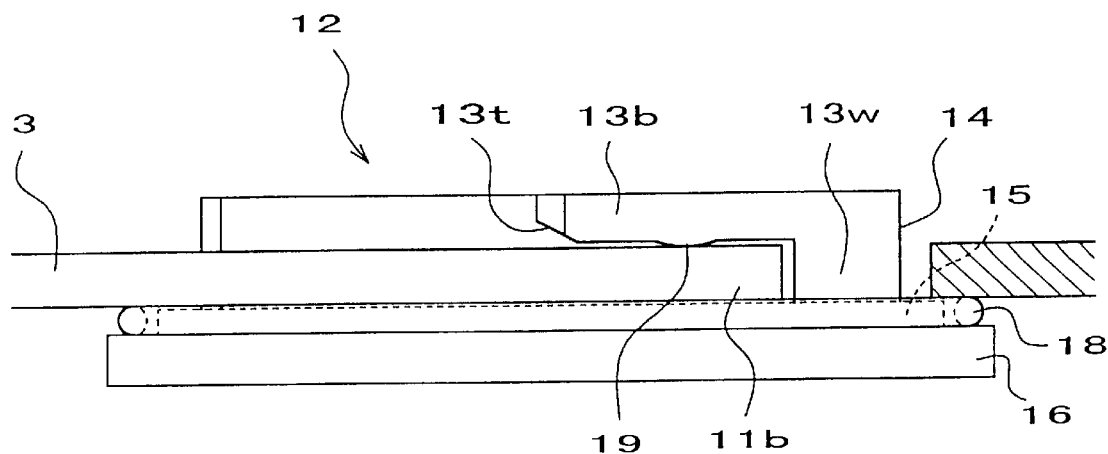
FIG. 5 is a magnifying view of FIG. 4C.

FIG. 1 is a sectional view showing an overall structure that a battery lid structure for a timepiece case of the invention is applied to a timepiece case having a back lid. FIG. 2 is a plan view showing a shape of a battery hole in the back lid. FIG. 3 show positional relationships between the battery hole and the battery lid in a state the battery lid is to be removed, wherein FIG. 3A is a plan view as viewed from a timepiece-interior side, FIG. 3B is a sectional view on line A—A in FIG. 3A, FIG. 3C is a sectional view on line B—B in FIG. 3A and FIG. 3D is a backside view as viewed from a timepiece-exterior side. Meanwhile, FIG. 4 show relationships in position between the battery hole and the battery lid in a state the battery lid is closed and not to be removed, wherein FIG. 4A is a plan view as viewed from a timepiece-interior side, FIG. 4B is a sectional view on line C—C in FIG. 4A, FIG. 4C is a sectional view on line D—D in FIG. 4A and FIG. 4D is a backside view as viewed from a timepiece-exterior side. FIG. 5 is a magnifying view of FIG. 4C.

A timepiece case 1 of the present embodiment is structured, as shown in FIG. 1, by a barrel 2 encompassing around in a periphery, a back lid 3 fixed at a lower end of the barrel 2, and a glass 4 attached on an upper end of the barrel 2. A battery 7 is accommodated in a battery accommodating portion 7h surrounded by a main plate 5 and a second main plate 6 thereon in the timepiece case 1. A dial 8 is accommodated on the second main plate, and hands 9a to 9c are rotatably arranged in a space between the dial 8 and an inner surface of the glass 4.

The back lid 3 has, at the immediately underneath the battery accommodating hole 7h, a different-shaped battery hole 10 having a pair of larger-diameter arcs 11b and a pair of smaller-diameter arcs 11s in an alternate fashion, as shown in FIG. 2. A battery lid 12 is fitted in the battery hole 10 in a manner described later.

The battery lid 12 has arcuate penthouses 13 provided in plurality (one pair in this embodiment) corresponding to the larger-diameter arcs 11b on an inner side of the timepiece and having a smaller radius than a radius of the larger-diameter arc 11b to have walls 13w at ends thereof, different-shaped barrels 14 continuing from a timepiece-outer side of the arcuate penthouse 13 and having a radius smaller than the radius of the smaller-diameter arc 11s, straight barrels 15 continuing from a timepiece-outer side of the different-shaped barrel 14 and having a radius greater than the radius of the arcuate penthouse 13, and a larger-diameter flange 16 continuing from a timepiece-outer side of the straight barrels 15 and having a radius greater than the radius of the larger-diameter arc 11b to provide a rectangular groove 17 in its outer surface.

Incidentally, the battery lid 12 of this embodiment is made of hard plastic, such as polycarbonate.

An elastic O-ring 18 for seal is clamped between a timepiece-interior-side surface of the larger-diameter flange 16 and a timepiece-exterior-side surface of the back lid or case bottom surface. The arcuate penthouse 13 has tapered portions 13t formed at circumferential tips on a wall-opposed side, and the arcuate penthouse 13 has an arcuate protrusion 19 in part of a surface on the timepiece-exterior side.

Described hereunder is the procedure of attaching and detaching the battery lid 12 to and from the battery hole 10 in the present embodiment of the invention and the operation of the present embodiment.

A. Attaching the battery lid 12

(1) As shown in FIG. 3A to FIG. 3D, the elastic O-ring 18 for seal is rested on the larger-diameter flange 16 of the battery lid 12 and positioned such that the arcuate penthouse 13 of the battery lid 12 positions to the larger-diameter arc 11b of the battery hole 10. The battery lid 12 is pushed in the battery hole 10 to a position where the tip of the tapered portion 13t of the arcuate penthouse 13 of the battery lid 12 positions closer to the timepiece interior than a surface level of the battery hole 10 on the timepiece-interior side.

(2) A coin at its edge is inserted in the rectangular groove 17 in the outer surface of the battery lid 12, to rotate the battery lid 12 in a direction of an arrow A in FIG. 3A, or direction of an arrow B in FIG. 3D. As a result, as shown in FIG. 4C to FIG. 5, the smaller-diameter arc 11s of the battery hole 10 is inserted between the tapered portion 13t of the arcuate penthouse 13 of the battery lid 12 and the timepiece-interior-side surface of the straight barrel 15 of the battery lid 12. The smaller-diameter arc 11s at an end face contacts a wall 13w in an end of the arcuate penthouse, to stop the rotation of the battery lid 12. At this time, as shown in FIG. 4B, FIG. 4C and FIG. 5, the battery lid 12 is urged toward the below in FIG. 4B, FIG. 4C and FIG. 5 (a timepiece-exterior side) by an elastic force of the sealing elastic O-ring clamped between the larger-diameter flange 16 of the battery lid 12 at the timepiece-interior side and an outer surface in a periphery of the battery hole 10 of the back lid 3. As a result, the timepiece-exterior-side surface of the arcuate penthouse 13 of the battery lid 12 is strongly contacted with the smaller-diameter arc 11s, so that the battery lid 13 is stably held in the battery hole 10.

Furthermore, an arcuate protrusion 19 provided in part of the arcuate penthouse 13 at the timepiece-exterior side interferes with the smaller-diameter arc 11s in the periphery of the battery hole 10 of the back lid 3. This provides heavy tightening when rotating the battery lid 12, preventing against disengagement due to natural reverse rotation.

B. Removal of the battery lid 12

In a state the battery lid is closed shown in FIG. 4A to FIG. 4D, a coin at its edge is inserted in the rectangular groove 17 in the outer surface of the battery lid 12 to rotate the battery lid 12 in a direction of an arrow C in FIG. 4A or an arrow D in FIG. 4D. As a result, the battery lid 12 and the battery hole 10 become a positional state shown in FIG. 3A to FIG. 3D, so that the battery lid 12 can be removed by its own weight.

(Second Embodiment)

A second embodiment of the invention will be explained below with reference to the drawings.

Figure 6:
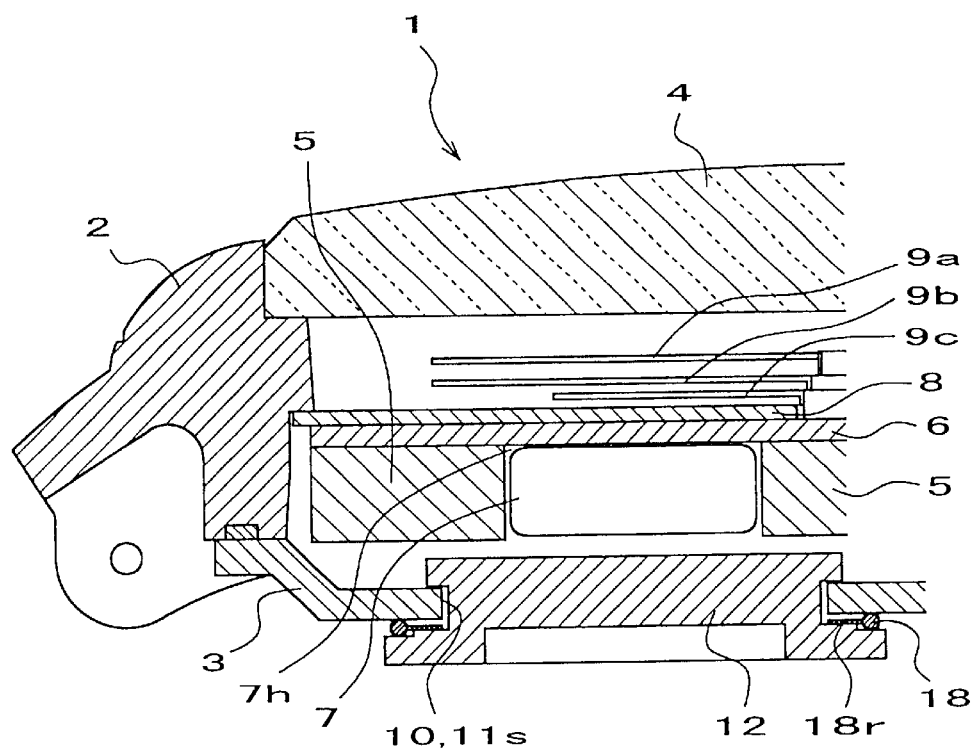
FIG. 6 is a sectional view showing an overall structure in a second embodiment that a battery lid structure for a timepiece case of the invention is applied to a timepiece case with a back lid.
Figure 7A:
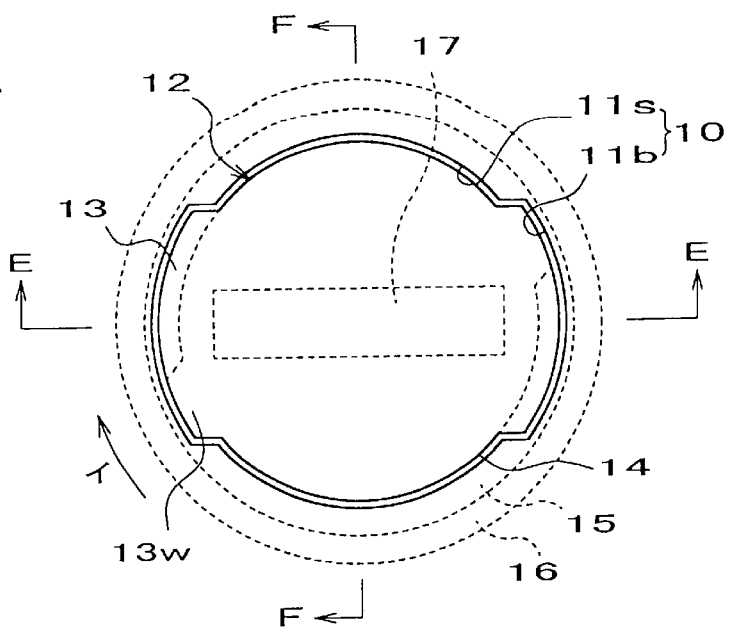
FIG. 7A is a plan view as viewed from a timepiece-interior side.
Figure 7B:
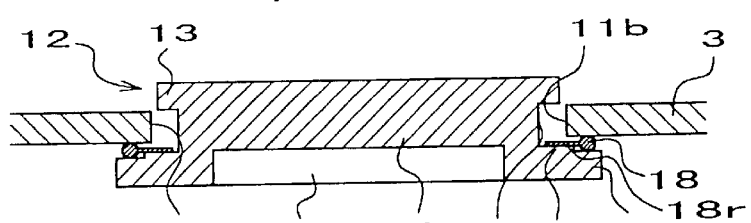
FIG. 7B is a sectional view on line E—E in FIG. 7A.
Figure 7C:
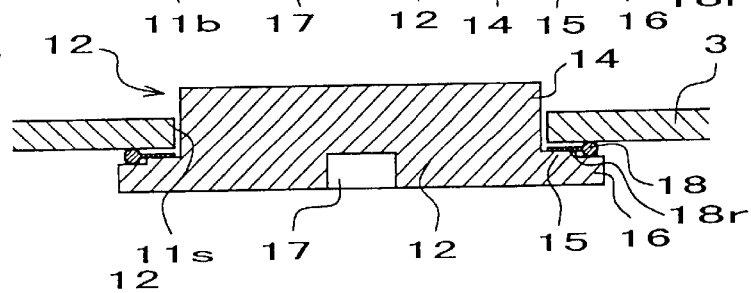
FIG. 7C is a sectional view on line F—F in FIG. 7A.
Figure 7D:
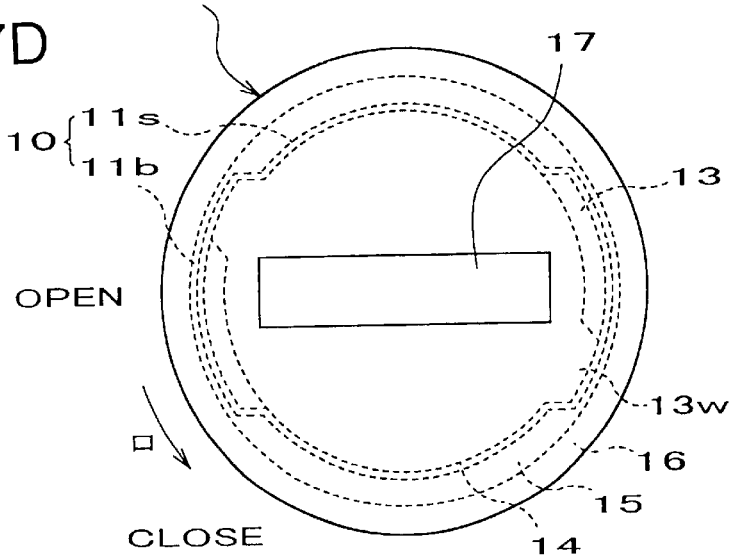
FIG. 7D is a backside view as viewed from a timepiece-exterior side.
Figure 9:
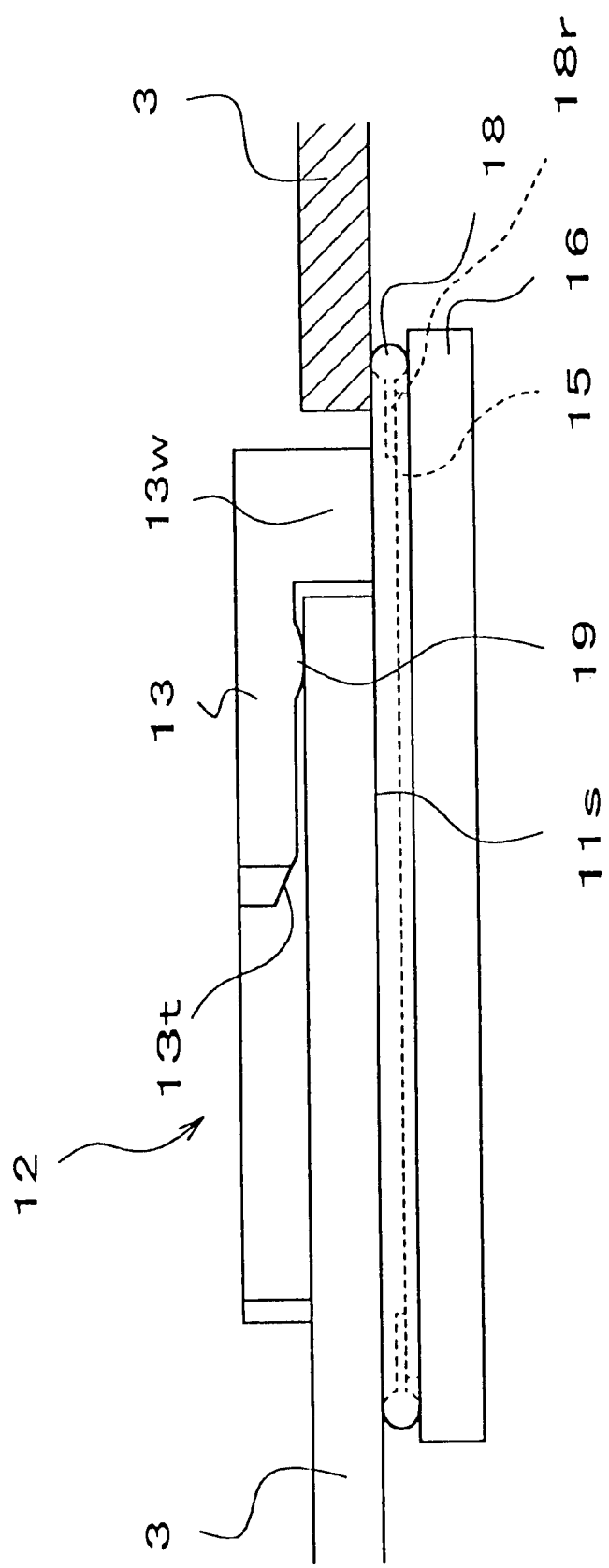
FIG. 9 is a magnifying view of FIG. 8C.

FIG. 6 is a sectional view showing an overall structure of a second embodiment that a battery lid structure for a timepiece case of the invention is applied to a timepiece case having a back lid. FIG. 7 show positional relationships between the battery hole and the battery lid in a state the battery lid is to be removed, wherein FIG. 7A is a plan view as viewed from a timepiece-interior-side, FIG. 7B is a sectional view on line E—E in FIG. 7A, FIG. 7C is a sectional view on line F—F in FIG. 7A, and FIG. 7D is a backside view as viewed from a timepiece-exterior side. Meanwhile, FIG. 8 show relationships in position between the battery hole and the battery lid in a state the battery lid is closed and not allowed for removal, wherein FIG. 8A is a plan view as viewed from a timepiece-interior side, FIG. 8B is a sectional view on line G—G in FIG. 8A, FIG. 8C is a sectional view on line H—H in FIG. 8A, and FIG. 8D is a backside view as viewed from a timepiece-exterior side. FIG. 9 is a magnifying view of FIG. 8C.

The structure of the present embodiment is the same as the first embodiment except for the following points.

That is, a rib 18r is provided which protrudes horizontally from an entire periphery of an inner surface of the sealing elastic O-ring 18.

By this structure, the rib 18r protruding horizontally from the entire periphery of the inner surface of the sealing elastic O-ring 18 is clamped between the arcuate penthouse 13 and the straight barrel 15 of the battery lid 12. Accordingly, when the battery lid 12 is removed from the battery hole 10 of the timepiece case, the sealing elastic O-ring 18 will not be disengaged from the battery lid 12. As a result, there is no possibility that the sealing elastic O-ring 18 is fallen out and lost.

The procedure of attaching and detaching the battery lid 12 to and from the battery hole 10 in the second embodiment of the invention is the same as the procedure of attachment and detachment in the first embodiment of the invention, omitting duplicated explanations.

In the above, the structural embodiments of the battery lid of the timepiece case of the invention were explained. However, the present invention is not limited to these.

For example, in the foregoing embodiments, the battery lid 12 used hard-plastic-make one. However, the larger-diameter flange 16 of the hard-plastic battery lid 12 in its outer and side surface may be covered with a metal thin sheet or the entire battery lid 12 may be made of metal. With such structure, the rigidity of the battery lid 12 is improved and the rectangular groove in the outer surface is less damaged thus improving outer appearance.

Meanwhile, although the foregoing embodiment was described for the case the invention was applied to the timepiece case having a back lid, the invention is applicable similarly to an integral-type timepiece case.

The present invention provides the following excellent effects.

(1) because complicate machining, such as for slant surfaces and stops, is not required in an inner surface of a back lid or case bottom surface, the back lid or case bottom surface can be reduced in thickness with a result that the timepiece overall can be made thin.

(2) in addition to the effect of (1), when the battery lid is removed from the timepiece-case battery hole, there is no possibility that the sealing elastic O-ring be disengaged from the battery lid, preventing the sealing elastic O-ring from falling and being lost.

What is claimed is:

1. A battery lid structure for a timepiece case comprising:

a case battery hole circumferentially having a plurality of alternate larger-diameter arcs and smaller-diameter arcs in a bottom surface of a back lid of a timepiece case having a back lid or an integral-type timepiece case;

arcuate penthouses provided in number corresponding to the large-diameter arcs in the battery lid at a timepiece-interior side and having a radius smaller than a radius of the larger-diameter arcs to have a wall portion at an end thereof;

a different-shaped barrel portion continuing from a timepiece-exterior side of the arcuate penthouse and having a radius smaller than a radius of the small-diameter arc;

a straight barrel portion continuing from a timepiece-exterior side of the different-shaped barrel portion and having a radius greater than a radius of the small-diameter arc;

a large-diameter flange portion continuing from an timepiece-exterior side of the straight barrel portion and having a radius greater than a radius of the large-diameter arc to provide a rectangular groove in an outer surface thereof; and a sealing elastic O-ring clamped between a timepiece-interior-side surface of the large-diameter flange portion and a timepiece-exterior-side surface of the back lid or the case bottom surface;

wherein a circumferential tip of the arcuate penthouse at a wall-opposed side is formed as a tapered portion;

the arcuate penthouse in part of the timepiece-exterior-side surface having an arcuate protrusion; and the battery lid being fitted between the timepiece-exterior-side surface of the arcuate penthouse of the battery lid and the timepiece-interior-side surface of the straight barrel portion, in a manner clamping the small-diameter arc portion of the battery hole.

2. A battery lid structure for a timepiece case as claimed in claim 1, wherein a rib is provided which horizontally protrudes from an entire periphery of an inner surface of the sealing elastic O-ring.

3. A timepiece case comprising:

a case battery hole circumferentially having a plurality of alternate larger-diameter arcs and smaller-diameter arcs in a bottom surface of a back lid of a timepiece case having a back lid or an integral-type timepiece case;

arcuate penthouses provided in number corresponding to the large-diameter arcs in the battery lid at a timepiece-interior side and having a radius smaller than a radius of the larger-diameter arcs to have a wall portion at an end thereof;

a different-shaped barrel portion continuing from a timepiece-exterior side of the arcuate penthouse and having a radius smaller than a radius of the small-diameter arc;

a straight barrel portion continuing from a timepiece-exterior side of the different-shaped barrel portion and having a radius greater than a radius of the small-diameter arc;

a large-diameter flange portion continuing from an timepiece-exterior side of the straight barrel portion and having a radius greater than a radius of the large-diameter arc to provide a rectangular groove in an outer surface thereof; and a sealing elastic O-ring clamped between a timepiece-interior-side surface of the large-diameter flange portion and a timepiece-exterior-side surface of the back lid or the case bottom surface;

wherein a circumferential tip of the arcuate penthouse at a wall-opposed side is formed as a tapered portion;

the arcuate penthouse in part of the timepiece-exterior-side surface having an arcuate protrusion; and the battery lid being fitted between the timepiece-exterior-side surface of the arcuate penthouse of the battery lid and the timepiece-interior-side surface of the straight barrel portion, in a manner clamping the small-diameter arc portion of the battery hole.

4. A timepiece case as claimed in claim 3, wherein a rib is provided which horizontally protrudes from an entire periphery of an inner surface of the sealing elastic O-ring.

* * * * *